Figure 1:
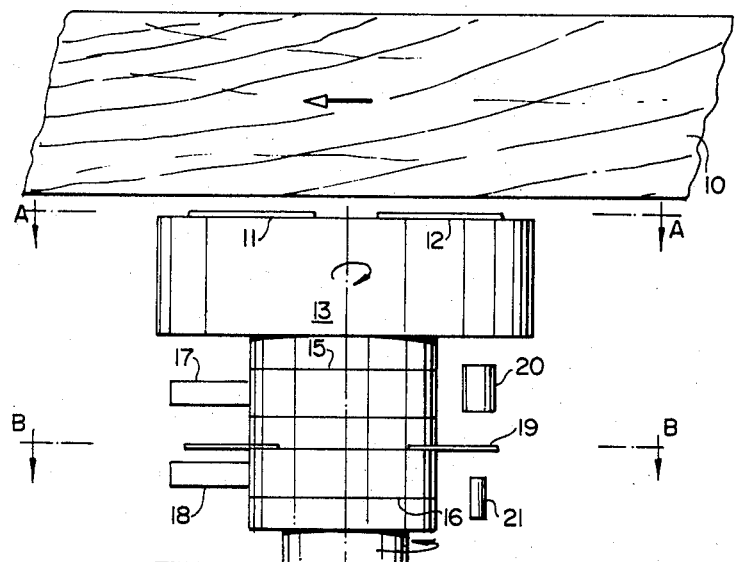

United States Patent
Norton et al.

[11] 3,805,156
[45] Apr. 16, 1974

[54] WOOD SLOPE OF GRAIN INDICATOR

[75] Inventors: John A. P. Norton, Calgary, Alberta; Thomas A. McLaughlan, Vancouver; Davor J. Kusec, Richmond, B.C., all of Canada

[73] Assignee: Canadian Patents and Development Limited, Ottawa, Ontario, Canada

[22] Filed: Apr. 19, 1973

[21] Appl. No.: 352,713

[30] Foreign Application Priority Data
June 29, 1972 Canada .................................. 146037

[52] U.S. Cl. ............................................ 324/61 R
[51] Int. Cl. ............................................. G01r 27/26
[58] Field of Search ......................... 324/61 R, 61 P

[56] References Cited
UNITED STATES PATENTS

| | | | |
|---|---|---|---|
| 3,448,381 | 6/1969 | Perry | 324/61 R |
| 2,885,633 | 5/1959 | Cook | 324/61 P |
| 3,340,400 | 9/1967 | Quittner | 324/61 R X |
| 3,375,441 | 3/1968 | McBrayer | 324/61 P |

*Primary Examiner*—Stanley T. Krawczewicz
*Attorney, Agent, or Firm*—James R. Hughes

[57] ABSTRACT

A method and apparatus for detecting wood grain slope by measuring the direction of the maximum and minimum electrical capacitance with respect to the axis of a piece of lumber. The method comprises rotating a pair of electrically energized capacitor plates closely adjacent a surface of the piece of lumber under test, measuring the sinusoidal variations in the capacitance value obtained as an analogue signal, comparing this signal as to phase with a reference signal related in frequency to the rotation of the capacitor plates, said phase relation being indicative of the direction of grain. The apparatus comprises a pair of spaced flat capacitor plates formed in the surface of a circular disc over which the wood workpiece would travel, means for rotating the disc at a precise rotation speed, means for measuring the sinusoidally varying capacitance in the form of a voltage, means for comparing the phase of this voltage with the phase of a reference AC voltage whose frequency is directly related to the rotation speed of the disc, and whose phase corresponds to zero slope-of-grain, means for measuring variations in phase displacement, said variations being directly related to variations of the grain slope of the wood from parallel to the wood piece axis. For three dimensional indicators two similar devices are placed at right angles such that two surfaces of the lumber are scanned at the same time.

9 Claims, 9 Drawing Figures

WOOD SLOPE OF GRAIN INDICATOR

This invention relates to a wood slope-of-grain indicator and more particularly to an electronic measuring apparatus employing capacitance measurements as the basis for determining slope-of-grain.

It is well known that the tensile strength of wood is much lower perpendicular to the grain than parallel to the grain and in general if grain direction is not parallel to the longitudinal axis of a wooden member the tensile or bending strength of that member will be correspondingly reduced. Standards have been set for the various lumber grades with respect to permissible slope-of-grain.

It is common practice to use visual methods on planed lumber to determine if slope-of-grain is within permissible limits. This method of course relies on the skill and experience of the operator or inspector. The limitations of this method are that the observations are based on the direction of the boundaries between the early and late wood and these are not necessarily parallel to the grain directions especially in spiral grain and the observations are strictly two dimensional and give no indication of slope perpendicular to the surface. Another method of determination is to scribe planed surfaces with the direction of the scribe marks indicating the slope-of-grain at the surface. This method mars the surface, is very tedious, and is strictly two dimensional. Another method is to split pieces from the wood to establish slope-of-grain but this is generally unacceptable as it is destructive.

It is an object of the invention to provide a method and apparatus for detecting slope-of-grain of wood rapidly and automatically.

It is another object of the invention to provide an electronic apparatus for measuring slope-of-grain that does not rely on the skill, experience, or art of the operator.

It is another object of the invention to provide apparatus for measuring slope-of-grain of planed lumber that will provide a three dimensional indication of grain direction.

These and other objects of the invention are achieved by a method and apparatus for detecting wood grain slope by measuring the direction of the maximum and minimum electrical capacitance with respect to the axis of a piece of lumber. The method comprises rotating a pair of electrically energized capacitor plates closely adjacent a surface of the piece of lumber under test, measuring the sinusoidal variations in the capacitance value obtained as an analogue signal, comparing this signal as to phase with a reference signal related in frequency to the rotation of the capacitor plates, said phase relation being indicative of the direction of grain. The apparatus comprises a pair of spaced flat capacitor plates formed in the surface of a circular disc over which the wood workpiece would travel, means for rotating the disc at a precise rotation speed, means for measuring the sinusoidally varying capacitance in the form of a voltage, means for comparing the phase of this voltage with the phase of a reference AC voltage whose frequency is directly related to the rotation speed of the disc, and whose phase corresponds to zero slope-of-grain, means for measuring variations in phase displacement, said variations being directly related to variations of the grain slope of the wood from parallel to the wood piece axis. For three dimensional indicators two similar devices are placed at right angles such that two surfaces of the lumber are scanned at the same time. The two readings may be assessed by the operator or a vector scanning circuit can be used if automatic operation is required. Another embodiment of the invention involves the use of a stationary detecting head with the electric field vector between electrodes being caused to rotate electronically.

Figure 2:
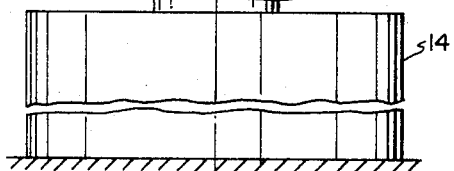
Figure 3:
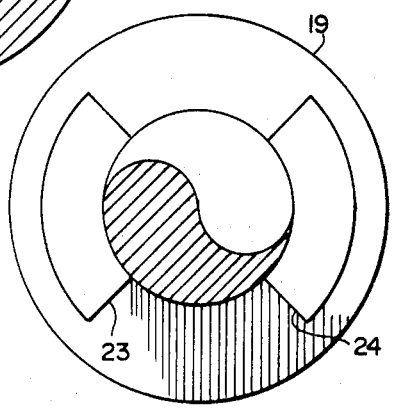
Figures 4, 5:
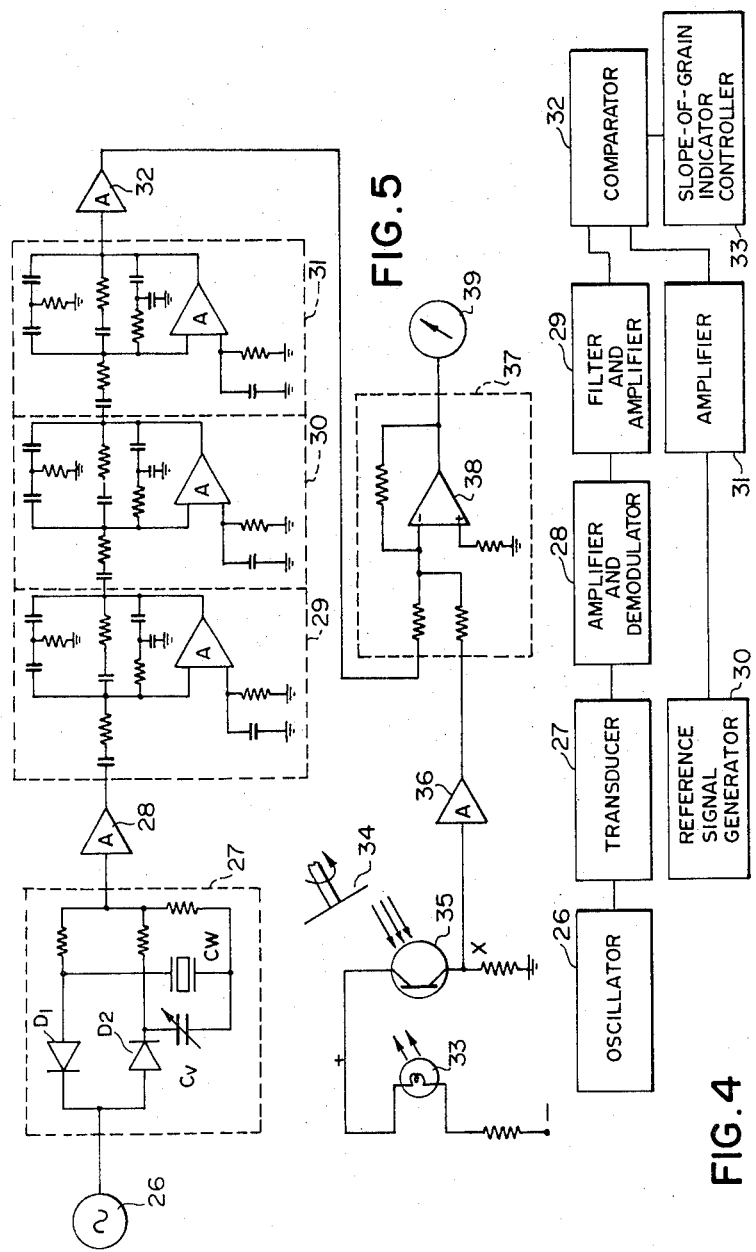
Figure 6:
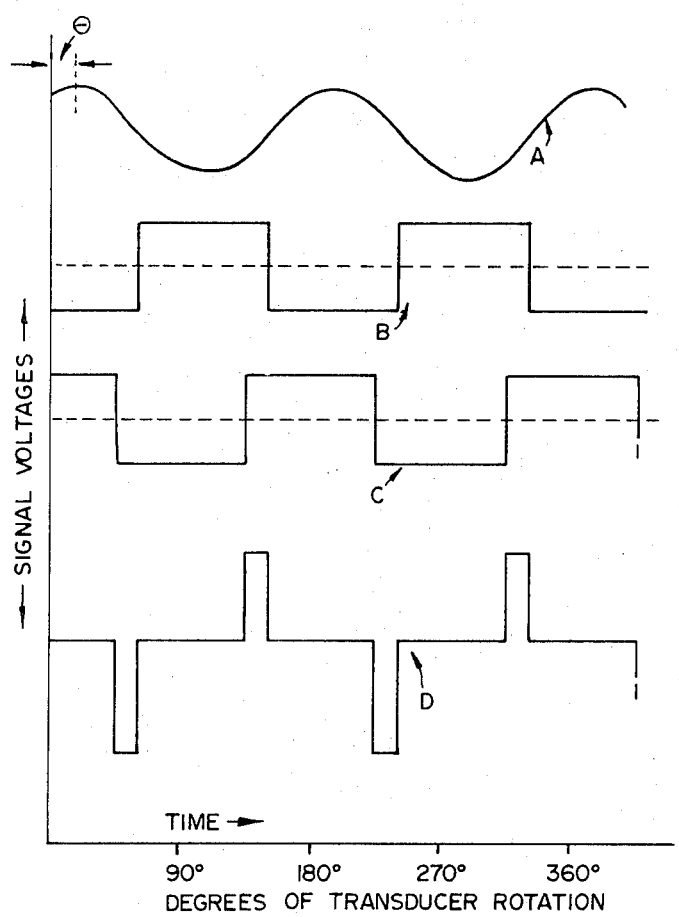
Figure 7:
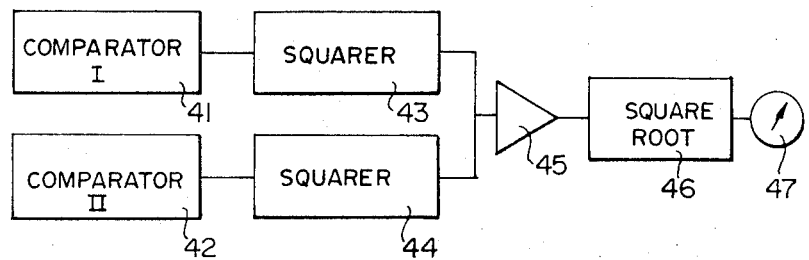
Figures 8, 9:
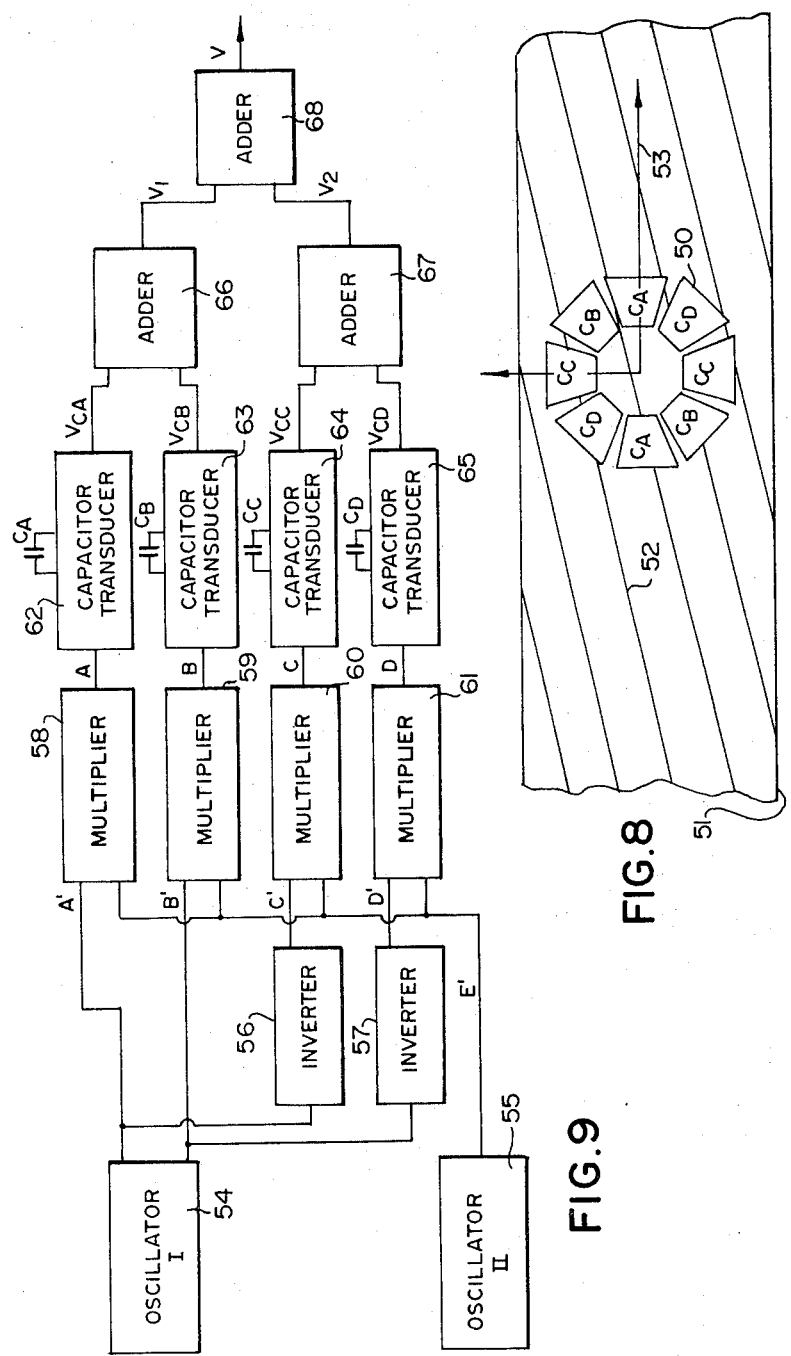

In drawings which illustrate an embodiment of the invention,

FIG. 1 is a side view of a slope-of-grain detector,
FIG. 2 is a view taken on section A—A of FIG. 1,
FIG. 3 is a view taken on section B—B of FIG. 1,
FIG. 4 is a block diagram of circuitry for the measuring system,
FIG. 5 is a complete circuit diagram,
FIG. 6 is a graph of output signal voltages,
FIG. 7 is a block diagram of a three dimensional slope measuring arrangement employing two orthogonal capacitor plate scanners,
FIGS. 8 and 9 illustrate a system wherein the scanning head is stationary and the electric field vector is caused to rotate electronically.

Referring to FIG. 1 the wood workpiece 10 is arranged to pass over capacitance plates 11 and 12 mounted on drum 13 which is rotated by motor 14. The capacitance plates in effect scan a surface of the wood board and if the capacitance between the plates is measured, a relative measure of the dielectric constant of the wood adjacent the plates is obtained. Because the dielectric strength is dependent to some degree on the grain slope, if the capacitor plates are rotated then a varying (sinusoidal) reading of capacitance will be obtained. The motor should operate at constant speed and there are suitable motors available on the market for this purpose. The speed should be chosen to be different from any possible interfering frequencies (e.g. the 60 cycle mains frequency) and speeds close to 20 or 40 RPS have been found to be suitable but 30 RPS is not acceptable because the main signal is then 60 hertz and cannot be filtered out of 60 hertz noise. On the motor shaft are mounted slip rings 15 and 16 and brushes 17 and 18 for energizing and taking an electrical output from the capacitors. A photo chopper 19 mounted on the shaft provides by means of light source 20 and light sensitive transistor 21, a square wave reference signal source. FIG. 2 shows the capacitor plates in plan taken on section A—A. They are mounted on or embedded in the upper surface of the drum and are suitably insulated and electrically isolated from each other. For best performance the plates should rotate as close to the wood surface as possible without actually touching. In an instrument built and tested the disc was 3 inches in diameter and the gap or spacing between was approximately ¼ inch. These dimensions are not extremely critical and various sizes and spacings may be used for varying purposes. FIG. 3 is a plan view taken on the section B—B of photo chopper 19. The openings 23 and 24 are cut to provide a square wave reference voltage via subsequent optics and electronic circuitry.

The FIG. 4 block diagram illustrates the overall system and has an oscillator 26 which provides an excitation voltage at a frequency which is in the kilocycle or low megacycle range, e.g. in the device built a 500 KHz frequency was used. This frequency is applied to the rotating capacitor plates of transducer 27 which in effect, due to the rotation and the directional variation of the dielectric constant of the wood, modulates this excitation voltage. The output of the transducer is amplified and demodulated by amplifier and demodulator 28 and the output which is a sinusoidal signal having a phase dependent on the grain slope is passed to band-pass filter and amplifier 29. The filtering action is required for smoothing and to obtain good signal-to-noise ratio of the output signal. A reference signal generator 30 which in effect is the light chopper arrangement described above provides a reference square wave voltage which after passing through amplifier 31 is applied along with the output of filter and amplifier 29 to comparator 32. The comparator compares the phase and provides an output signal, e.g. a dc voltage, that is proportional to phase displacement and thus slope-of-grain angle. A suitable indicator 33 for the operator is provided and if required a controller that would give an audio signal or mark the wood in some way if the grain slope is outside certain set limits.

FIG. 5 gives complete detail of the electronic system with oscillator 26 providing a high frequency signal (e.g. 500 KHz, 20 volts) to transducer 27 which is made up of a diode twin-T network including matched diodes D1 and D2, the capacitance of the wood $C_w$ and capacitance $C_v$ for adjustment purposes. The output which is the input signal modulated by the varying capacitance given by $C_w$ and demodulated by the diodes is amplified by amplifier 28 and passed to three filter stages 29, 30, and 31 which are required to isolate the signal from the noise, i.e. removes undesirable signals whose frequencies are not in the band-pass range (the rotation frequency ± about 5 hertz). More detailed information on the specific type of filter described here may be found in the reference "Applications Manual for Computer Amplifiers for Modelling, Measuring, Manipulation and Much Else" published by Philbrick Research Inc. Amplifiers 28 and 32 amplify the signal before and after filtering and convert the filtered sinusoidal output wave into a square wave output because amplifier 32 is driven into saturation. Light source 33 provides light which after being chopped by photochopper represented by 34 impinges on phototransistor 35 giving a square wave output at point X of frequency precisely equal to the rotation frequency of the motor and capacitor plates. This is amplified by amplifier 36 and applied to one terminal of comparator 37 which is an operational amplifier 38 connected as a summing amplifier. The output of the comparator is a waveform whose width is proportional to the angle between the longitudinal axis of the board being tested and the slope-of-grain and is measured and indicated by suitable indicator or readout 39.

The graph of FIG. 6 shows the action of the comparator in terms of waveforms. Sinusoidal curve A is the output of the transducer and is shifted from a reference by the phase angle $\theta$. Curve B is the square wave output from filter and amplifier and curve C is the square wave reference voltage. Curve D is the output from the comparator which is a series of square wave voltage pulses whose width is related to the phase shift angle $\theta$. This voltage can be measured by obtaining a dc average of the positive voltage peaks or by applying signals B and C to an ac wattmeter which then acts as the comparator. The output indicator may also include a controller for spray marking or may actuate a recorder or computer.

The apparatus described above gives slope-of-grain in two dimensional form and to obtain a three dimensional reading two detecting heads positioned orthogonally to scan two adjacent surfaces are required. FIG. 7 shows a set-up for this in block form. The output of the two comparators 41 and 42 are squared by squaring circuitry 43 and 44 whose outputs are summed by summing amplifier 45. The square root is taken by square root circuitry 46. The output error using this method of vector addition has been found to be less than 0.1 degree for slopes-of-grain up to 15°.

In an actual device built and tested the following factors were found to apply. The capacitance measured by the rotating transducer is approximately 5 to 10 picofarads. The wood causes this to vary sinusoidally by approximately ±0.5 picofarads. Increased moisture content in the wood increases the dielectric constant and consequently the capacitance measurements but does not affect the slope-of-grain indication. Increased density of the wood has much the same effect as increased moisture content. Increased distance of the transducer from the surface of the wood results in weaker signals for capacitance but does not alter the slope-of-grain indication except that for distances in excess of approximately ⅛ inch the indication may be erratic or zero. Roughness of the surface has no effect other than to alter the effective transducer to surface distance. Tilt of the transducer with respect to the surface has no effect if the average transducer to surface distance is unchanged. A vibratory motion between the transducer and the surface could cause a shift of slope-of-grain indication in the present model if the frequency were close to 40 hz. Otherwise the shift should not be significant. Moisture and density gradients could cause errors of several degrees if the wood were stationary and the gradients were at 45° to the slope-of-grain. For practical feed rates the gradients could not be maintained for sufficient distance to make such errors significant. The resolution of the detector can be estimated if it is assumed that three cycles of output signal are required to make a determination. With a feed rate of 5 feet per second and a transducer rotation rate of 20 hertz, the resolution would be 3/40 × 5 × 12 = 4.5 inches. This could be increased by increasing the rate of heat rotation, but would be decreased by increasing the feed rate. The rotation rate of the experimental head was 20 rps. It is desirable to have this as high as possible without causing undue wear in the slip rings and motor bearings. 40 rps is recommended. The band-pass filters should then be centered on 80 hz. to effectively eliminate undesirable noise at other frequencies. The geometry of the capacitance plates in the transducer might be modified to produce more penetration of the electrical field into the wood but two thin, insulated metallic dees appear to be quite effective. The separation distance should be about 2.5 times the distance from the wood. In performing its filtering function the three-stage band-pass filter retards the phase of the signal that is dependent on signal frequency. Any such shift must be compensated for or the detector, being a phase shift type, will read incorrectly. If the rotation frequency of the head is maintained very constant the shift will be constant and can be compensated for physically shifting the orientation of the reference signal chopper plate. If the rotation frequency of the head cannot be maintained constant a duplicate three-stage band-pass filter can be used on the reference signal to produce an equivalent shift.

In the description given above relative rotation between the wood and the capacitor plates is obtained mechanically. This is an effective and generally straight-forward method but does present some problems especially of possible wear between plates and the wood and spurious signals due to dust and dirt and outside interference. An electronic method of giving relative rotation, i.e. a non-rotating head that generates a rotating electrical field may be used. The head would require multiple electrode (capacitor) plates or an antenna configuration. One such system is shown in FIGS. 8 and 9. The stationary transducer consists of eight plates each subtending a 45° angle. The diagonally opposite pairs of plates (shown as $C_A$, $C_B$, $C_C$, and $D_D$) are connected as separate capacitors. The transducer head 50 is positioned over the piece of lumber 51 having slope-of-grain direction 52 and longitudinal axis 53. The circuitry is shown specifically in FIG. 9 and includes two oscillators 54 and 55. The first oscillator has a frequency equal to twice the desired rotation frequency and generates two sinusoidal signals, one lagging the other by 90°. These two signals (indicated as $A^1$ and $B^1$) are fed to inverters 56 and 57 which provide signals $C^1$ and $D^1$, 180° out of phase with signals $A^1$ and $B^1$. Each of these four signals along with a carrier signal ($E^1$) from oscillator 55 which produces a signal in the low megahertz range are multiplied in miltipliers 58, 59, 60, and 61 to give four signals A, B, C, and D which are applied to the four identical sets of capacitor plates $C_A$, $C_B$, $C_C$, and $C_D$ in transducers 62, 63, 64, and 65. The output voltages $V_{CA}$, $V_{CB}$, $V_{CC}$, $V_{CD}$) from the capacitors are proportional to the capacitances and are summed as shown in adders 66, 67, and 68 to produce voltages $V_1$ and $V_2$ and then output voltage V. This output voltage is proportional to the phase displacement of the capacitance maximum referred to a datum normally the longitudinal axis of the wood piece and this can readily be shown mathematically. It will be realized that the applied quadrature voltages provide a rotating effect analogous to the rotating field in a two-phase motor.

The embodiments of the invention in which an exclusive property or privilege is claimed are defined as follows:

1. A method of determining the slope-of-grain of wood comprising rotating a pair of electrically energized capacitor plates closely adjacent a surface of the piece of lumber under test, measuring the sinusoidal variations in the capacitance value obtained as an analogue signal, comparing this signal as to phase with a reference signal directly related in frequency to the rotation speed of the capacitor plates, said phase relation being indicative of the slope-of-grain in relation to the longitudinal axis of the piece of lumber.

2. Apparatus for measuring the slope-of-grain of wood comprising:
   a. at least one pair of spaced electrodes,
   b. means connected to the said electrodes for rotating the said pairs of electrodes at a precise rotation speed in a plane parallel to and adjacent a surface of the wood board to be tested,
   c. capacitance measuring means connected to the said electrodes for measuring the sinusoidally varying capacitance between the electrodes in the form of an analogue signal,
   d. electrical signal generating means connected to the said means for rotating the said electrodes for providing a reference AC signal whose frequency is directly related to the rotation speed of the capacitance effect between electrodes, and
   e. phase measuring means connected to the said capacitance measuring means and the said electrical signal generating means for comparing the phase of the analogue signal with the phase of the reference AC signal, variations in the phase relationship of the two signals being related to variations of the slope-of-grain from parallel to the longitudinal axis of the board.

3. Apparatus for measuring the slope-of-grain as in claim 2 wherein the electrodes are two generally flat spaced capacitor plates forming a rotatable disc shaped structure.

4. Apparatus for measuring the slope-of-grain of wood as in claim 2 wherein the electrodes are connected to a signal voltage source providing energization voltage in the kilocycle or low megacycle frequency range, said voltage being modulated sinusoidally by the varying capacitance and wherein the capacitance measuring means is a demodulator connected to the electrodes and providing an output sine wave voltage.

5. Apparatus for measuring the slope-of-grain of wood in three dimensional terms comprising:
   a. a first pair of spaced electrodes,
   b. means connected to the first pair of electrodes for rotating them at a precise rotation speed in a plane parallel to and adjacent a first surface of the wood board to be tested,
   c. a second pair of spaced electrodes,
   d. means connected to the second pair of electrodes for rotating them at a precise rotation speed in a plane parallel to and adjacent a second surface of the board orthogonal to the first surface,
   e. first capacitance measuring means connected to the said first pair of electrodes for measuring the sinusoidally varying capacitance between them in the form of a first analogue signal,
   f. second capacitance measuring means connected to the said second pair of electrodes for measuring the sinusoidally varying capacitance between them in the form of a second analogue signal,
   g. a first electrical signal generating means connected to the said means for rotating the first pair of electrodes for providing a first reference AC signal whose frequency is directly related to the rotation speed of the first pair of electrodes,
   h. a second electrical signal generating means connected to the said means for rotating the second pair of electrodes for providing a second reference AC signal whose frequency is directly related to the rotation speed of the second pair of electrodes,
   i. first phase measuring means connected to the first capacitance measuring means and the first electrical signal generating means for measuring the phase relationship between the first analogue signal and the first reference ac signal and providing a first output signal related to this phase relationship,
   j. second phase measuring means connected to the second capacitance means and the second electrical signal generating means for measuring the phase relationship between the second analogue signal and the second reference ac signal and providing a second output signal related to this phase relationship, and k. summing means connected to the output of first and second phase measuring means for adding said first and second output signals as orthogonal vector quantities to give a single output signal related to the angle between the slope-of-grain of the board and the longitudinal axis of the board.

6. Apparatus for measuring the slope-of-grain of wood as in claim 5 wherein the pairs of electrodes are in the form of two generally flat, spaced capacitor plates forming a rotatable disc shaped structure.

7. Apparatus for measuring the slope-of-grain of wood as in claim 5 wherein the means for adding said first and second output signals as orthogonal vector quantities comprises means for squaring the first and second output signal values, means for summing said squared values, and means for taking the square root of the summed value.

8. Apparatus for measuring the slope-of-grain of wood comprising:

a. at least two pairs of spaced electrodes b. means connected to said electrodes for energizing said pairs of electrodes with high frequency electrical signals such that a measured capacitance value between pairs of said electrodes rotates electronically at a precise rotation speed in a plane parallel to and adjacent a surface of the wood board to be tested, c. capacitance measuring means connected to said electrodes for measuring the sinusoidally varying capacitance between the pairs of electrodes in the form of analogue signals, d. means connected to the capacitance measuring means for combining the said analogue signals to provide an output analogue signal, said signal being related to variations of the slope-of-grain from a predetermined datum of the wood board.

9. Apparatus for measuring the slope-of-grain of wood as in claim 8 wherein the electrodes are four pairs of flat triangular, spaced capacitor plates forming a disc shaped transducer structure.

* * * * *